(12) United States Patent
Yamazaki et al.

(10) Patent No.: US 11,402,500 B2
(45) Date of Patent: Aug. 2, 2022

(54) SONIC WAVE SENSOR UNIT, AND RECORDING DEVICE

(71) Applicant: SEIKO EPSON CORPORATION, Tokyo (JP)

(72) Inventors: Shinya Yamazaki, Shiojiri (JP); Osamu Murayama, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/177,558

(22) Filed: Feb. 17, 2021

(65) Prior Publication Data

US 2021/0263148 A1 Aug. 26, 2021

(30) Foreign Application Priority Data

Feb. 20, 2020 (JP) .............................. JP2020-027008

(51) Int. Cl.
*G01S 15/08* (2006.01)
*B41J 2/045* (2006.01)

(52) U.S. Cl.
CPC ........... *G01S 15/08* (2013.01); *B41J 2/04526* (2013.01); *B41J 2/04586* (2013.01)

(58) Field of Classification Search
CPC .... B41J 2/04526; B41J 2/04586; G01S 15/08
See application file for complete search history.

(56) References Cited

U.S. PATENT DOCUMENTS 10,203,404 B2 * 2/2019 Ohashi .................... G01S 7/526
2019/0242985 A1 8/2019 Ishii et al.

FOREIGN PATENT DOCUMENTS

JP   H08-189962   7/1996
JP   2019-140672  8/2019

* cited by examiner

*Primary Examiner* — Thinh H Nguyen
(74) *Attorney, Agent, or Firm* — Workman Nydegger

(57) ABSTRACT

A sonic wave sensor unit includes an element substrate having a transmitting element having a transmission side piezoelectric element and transmitting a sonic wave to a medium, and a receiving element having a reception side piezoelectric element and a reception side vibrating surface and receiving a sonic wave reflected by the medium, a sonic wave sensor including a sealing substrate configured to seal the transmission side piezoelectric element and the reception side piezoelectric element, and a holder disposed on a side opposite to the element substrate with respect to the sealing substrate in a −Z direction and fixed to the sealing substrate, wherein a through hole penetrating the holder in the −Z direction is formed in the holder, and, in plan view viewed in the −Z direction, the reception side vibrating surface is disposed inside a wall surface of the holder constituting the through hole.

6 Claims, 14 Drawing Sheets

SONIC WAVE SENSOR UNIT, AND RECORDING DEVICE

The present application is based on, and claims priority from JP Application Serial Number 2020-027008, filed Feb. 20, 2020, the disclosure of which is hereby incorporated by reference herein in its entirety.

BACKGROUND

1. Technical Field

The present disclosure relates to a sonic wave sensor unit, and a recording device including the sonic wave sensor unit.

2. Related Art

For example, an ultrasonic wave sensor (sonic wave sensor unit) in which an ultrasonic element (sonic wave element) is housed in an element-accommodating case having sealing structure has been known (JP 2019-140672 A).

The sonic wave element includes an element for transmission (transmitting element) that converts an electrical signal into a sonic wave vibration, and an element for reception (receiving element) that converts a sonic wave vibration into an electrical signal. The element-accommodating case includes a top plate portion disposed facing the sonic wave element with a gap space interposed therebetween, and a diaphragm portion that, when a sonic wave is transmitted or received by a sonic wave element, vibrates by the sonic wave is provided in the top plate portion. In other words, the diaphragm portion includes a transmission side diaphragm portion that corresponds to the transmitting element and transmits a sonic wave, and a reception side diaphragm portion that corresponds to the receiving element and receives a sonic wave.

According to such a configuration, a sonic wave vibration of the transmitting element is transmitted to an external space via the gap space and the transmission side diaphragm portion, and further, a sonic wave vibration of the external space is propagated to the receiving element via the reception side diaphragm portion and the gap space. In this way, in the sonic wave sensor unit described in JP 2019-140672 A, sonic wave vibrations are transferred between the gap space between the sonic wave element and the diaphragm portion, and the external space outside the diaphragm portion, in a state in which gasses such as air are not transferred.

However, in the sonic wave sensor unit described in JP 2019-140672 A, a sonic wave vibration of the transmitting element propagates in the element-accommodating case, or is reflected by a wall surface of the element-accommodating case, and thus there has been a possibility that the receiving element that converts a sonic wave vibration to an electrical signal is adversely affected.

SUMMARY

A sonic wave sensor unit includes an element substrate having a transmitting element having a transmission side piezoelectric element and a transmission side vibrating surface coupled to the transmission side piezoelectric element and capable of transmitting a sonic wave to a target, and a receiving element having a reception side piezoelectric element and a reception side vibrating surface coupled to the reception side piezoelectric element and capable of receiving a sonic wave reflected by the target, a sonic wave sensor including a sealing substrate facing the element substrate and configured to seal the transmission side piezoelectric element and the reception side piezoelectric element, and a holder disposed on a side opposite to the element substrate with respect to the sealing substrate in a first direction heading from the sealing substrate toward the element substrate and fixed to the sealing substrate, wherein a hole penetrating the holder in the first direction is formed in the holder, and, in plan view viewed in the first direction, the reception side vibrating surface is disposed inside a wall surface of the holder constituting the hole.

A recording device includes the sonic wave sensor unit, a recording head performing recording on the target, and a carriage to which the sonic wave sensor unit and the recording head are attached.

DESCRIPTION OF EXEMPLARY EMBODIMENTS

1. Exemplary Embodiment 1

1.1 Overview of Recording Device

Figure 1:
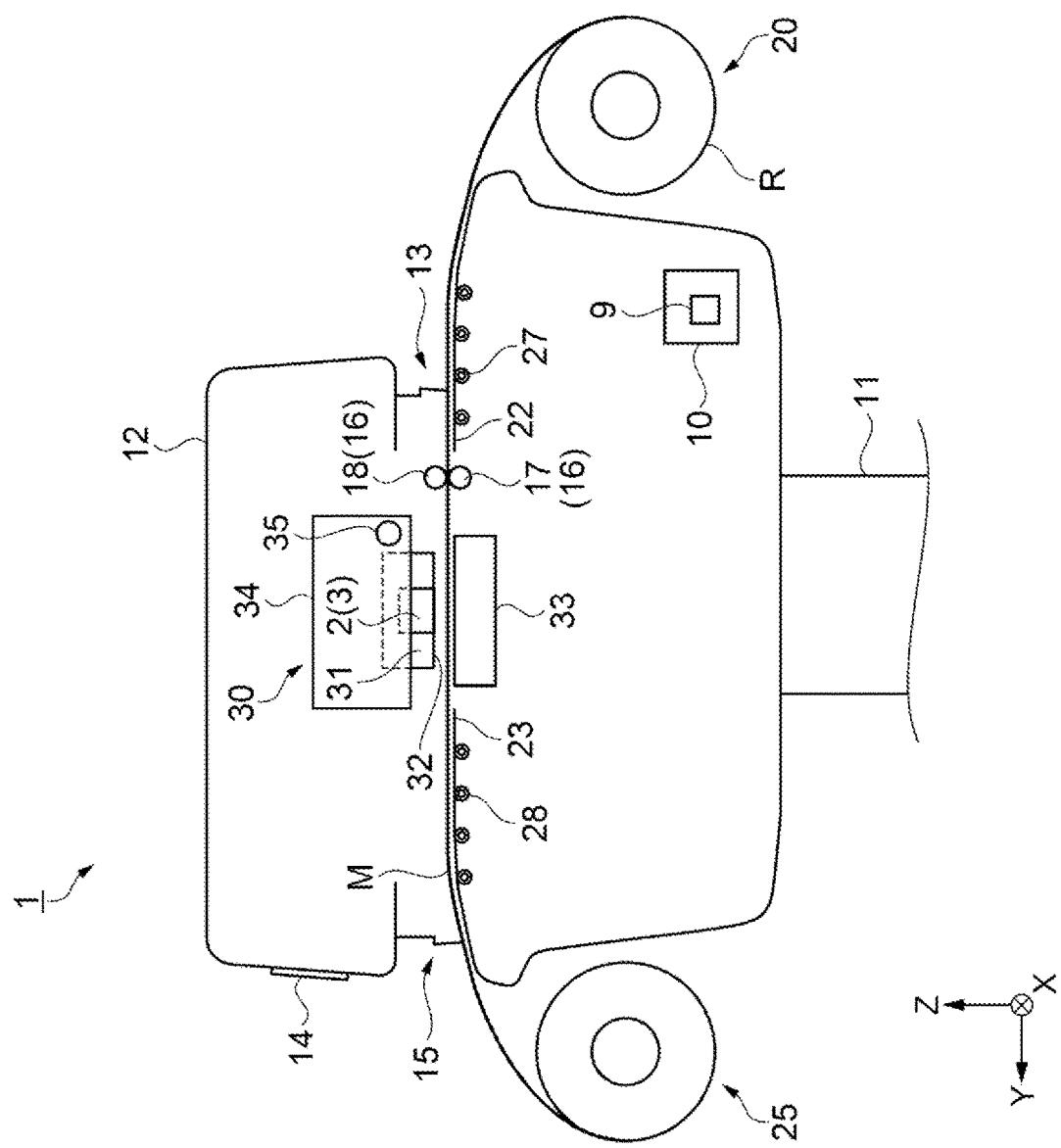
FIG. 1 is a schematic view of a recording device according to Exemplary Embodiment 1.

As illustrated in FIG. 1, a recording device 1 according to Exemplary Embodiment 1 is a large format printer handling an elongated medium M. The recording device 1 includes a leg portion 11, a housing portion 12 supported by the leg portion 11, a set unit 20 and a winding unit 25 attached to both ends of the housing portion 12 respectively, and an operating unit 14 attached to one end of the housing portion 12. Woodfree paper, cast coated paper, art paper, coat paper, synthetic paper, or a film formed of polyethylene terephthalate (PET), polypropylene (PP) or the like can be used as the medium M, for example. In the following description, a width direction of the recording device 1 (width direction of the medium M) is referred to as an X direction, a height direction of the recording device 1 is referred to as a Z direction, and a depth direction of the recording device 1 intersecting the X direction and the Z direction is referred to as a Y direction. Further, a leading-end side of an arrow indicating a direction is defined as a + direction, and a base-end side of the arrow indicating the direction is defined as a − direction. a −Z direction is a gravitational direction, and a plane disposed along the X direction and the Y direction (XY plane) is a horizontal plane.

Note that, the medium M is an example of a target in the present application. Note that, the −Z direction is an example of a first direction in the present application. Viewing from the −Z direction is an example of a plan view viewed in the first direction of the present application, and is hereinafter referred to as a plan view viewed in the Z direction.

Furthermore, in the following description, a +X direction and a −X direction are referred to as a scanning direction X, and a +Y direction is referred to as a transport direction Y. The transport direction of the medium M varies at each point of a transport path from the set unit 20 to the winding unit 25, and the transport direction Y is a direction in which the medium M is transported near a printing unit 30, which will be described later.

The printing unit 30 for performing printing on the elongated medium M and a control unit 10 for controlling each unit of the recording device 1 are provided inside the housing portion 12. The printing unit 30 includes a carriage 34 movable in the scanning direction X, a recording head 31 attached to the carriage 34 and performing recording on the medium M, a transport unit 16 capable of transporting the medium M in the transport direction Y, and a platen 33 disposed facing a nozzle formation surface 32 of the recording head 31. The control unit 10 includes a sonic wave element control unit 9 that controls a sonic wave element 7.

A sonic wave sensor unit 2 in addition to the recording head 31 is attached to the carriage 34. Also, the sonic wave sensor unit 2 and the recording device 1 are installed in air.

As described above, the recording device 1 according to the present exemplary embodiment includes the sonic wave sensor unit 2, the recording head 31 performing recording on the medium M, and the carriage 34 to which the sonic wave sensor unit 2 and the recording head 31 are attached.

An upstream side medium support portion 22 is disposed upstream the platen 33 in the transport direction Y, and a downstream side medium support unit 23 is disposed downstream the platen 33 in the transport direction Y. The elongated medium M, while being supported by the upstream side medium support portion 22, the platen 33, and the downstream side medium support portion 23, is transported by the transport unit 16 in a direction heading from the upstream side medium support portion 22 toward the downstream side medium support portion 23 (transport direction Y).

The medium M is unwound from a roll body R contained in the set unit 20, and is fed inside the housing portion 12 from a feeding port 13. The medium M fed from the set unit 20 is guided to the transport unit 16 while being supported by the upstream side medium support portion 22. The medium M guided to the transport unit 16 is transported toward the platen 33 by the transport unit 16.

With the medium M supported by the platen 33, an image is formed on the medium M by discharging ink from the recording head 31 onto the medium M. The medium M on which the image is formed is discharged from a discharge port 15 outward the housing portion 12 while being supported by the downstream side medium support portion 23, and is wound into a roll shape by the winding unit 25.

A heater 27 is attached to the upstream side medium support portion 22, a heater 28 is attached to the downstream side medium support portion 23, and a heater (not illustrated) is attached to the platen 33 as well. The heaters 27 and 28 are tube heaters, for example.

In order to rapidly dry ink discharged onto the medium M, the platen 33 is heated by a heater such that a temperature thereof is increased from a room temperature to a predetermined temperature. The heater 27 gradually increases a temperature of the medium M such that a temperature of the medium M gradually reaches a predetermined temperature greater than the room temperature via the upstream side medium support portion 22. The heater 28 increases the temperature of the medium M to a temperature greater than the predetermined temperature via the downstream side medium support portion 23, and dries the ink discharged onto the medium M before the medium M is wound around the winding unit 25.

The transport unit 16 is disposed upstream the recording head 31 in the transport direction Y, and includes a driving roller 17 and a driven roller 18. The driven roller 18 is pressed against the driving roller 17 via the medium M and is rotationally driven. The driving roller 17 pinches the medium M together with the driven roller 18. The driving roller 17 is directly or indirectly joined to a power source, such as a motor (not illustrated), and driving force is transmitted from the power source. The driving roller 17 rotationally drives to transport the medium M in the transport direction Y.

The operating unit 14 is constituted by, for example, a liquid crystal display device including a touch panel. An operator can perform various types of setting for the recording device 1 by the operating unit 14.

The carriage 34 is supported by a guide shaft 35 that extends in the scanning direction X, and is movable in the direction in which the guide shaft 35 extends (scanning direction X). The recording head 31 and the sonic wave sensor unit 2 attached to the carriage 34 are movable together with the carriage 34 in the scanning direction X.

The sonic wave element control unit 9 calculates a distance from the sonic wave sensor unit 2 to the medium M, based on a signal of the sonic wave sensor unit 2. The control unit 10 calculates an interval between the nozzle formation surface 32 of the recording head 31 and the medium M, based on a calculation result of the sonic wave element control unit 9. Furthermore, the control unit 10 adjusts a position of at least one of the platen 33 and the carriage 34 in the Z direction such that the interval between the nozzle formation surface 32 of the recording head 31 and the medium M is maintained to be a predetermined interval. For example, the control unit 10 controls a movement mechanism (not illustrated) that moves at least one of the platen 33 and the carriage 34 in the +Z direction or the −Z direction.

When the interval between the nozzle formation surface 32 of the recording head 31 and the medium M is maintained to be the predetermined interval, a flight distance of ink discharged from the recording head 31 onto the medium M is maintained to be a predetermined distance, ink discharged from the recording head 31 lands at a target position on the medium M, and quality of an image formed on the medium M is enhanced.

1.2 Overview of Sonic Wave Sensor Unit

Figure 2:
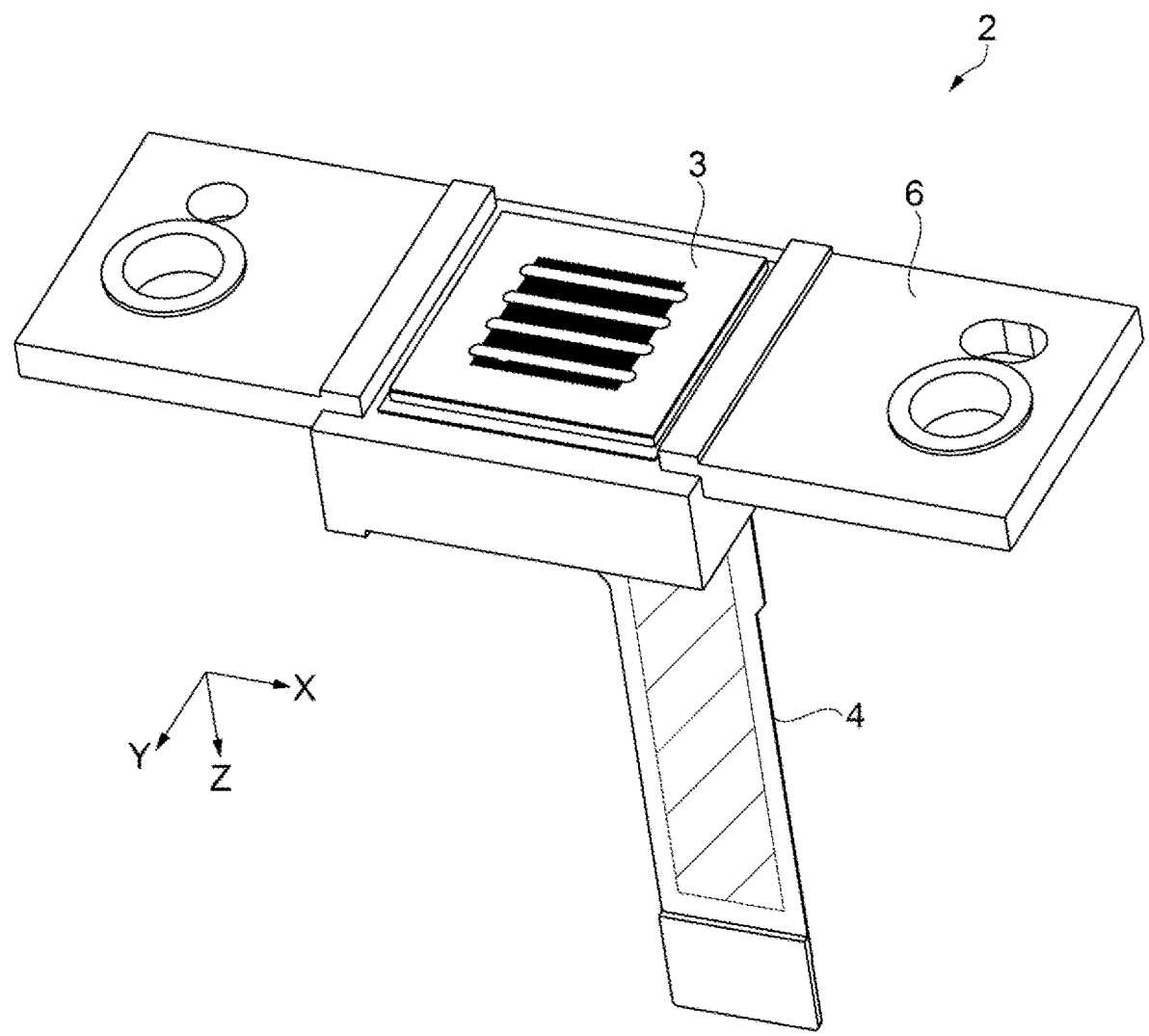
FIG. 2 is a perspective view of a sonic wave sensor unit according to Exemplary Embodiment 1.

As illustrated in FIG. 2, the sonic wave sensor unit 2 includes a sonic wave sensor 3, a wiring substrate 4 coupling the sonic wave sensor 3 and the sonic wave element control unit 9, and a holder 6 supporting the sonic wave sensor 3.

The wiring substrate 4 is constituted by, for example, an FPC (Flexible Printed Circuit), and has flexibility. Hereinafter, details of each component will be described in a state in which a first side 401 of an element substrate 40, which will be described later, is disposed along the X direction, and a second side 402 intersecting the first side 401 is disposed along the Y direction.

Figure 3:
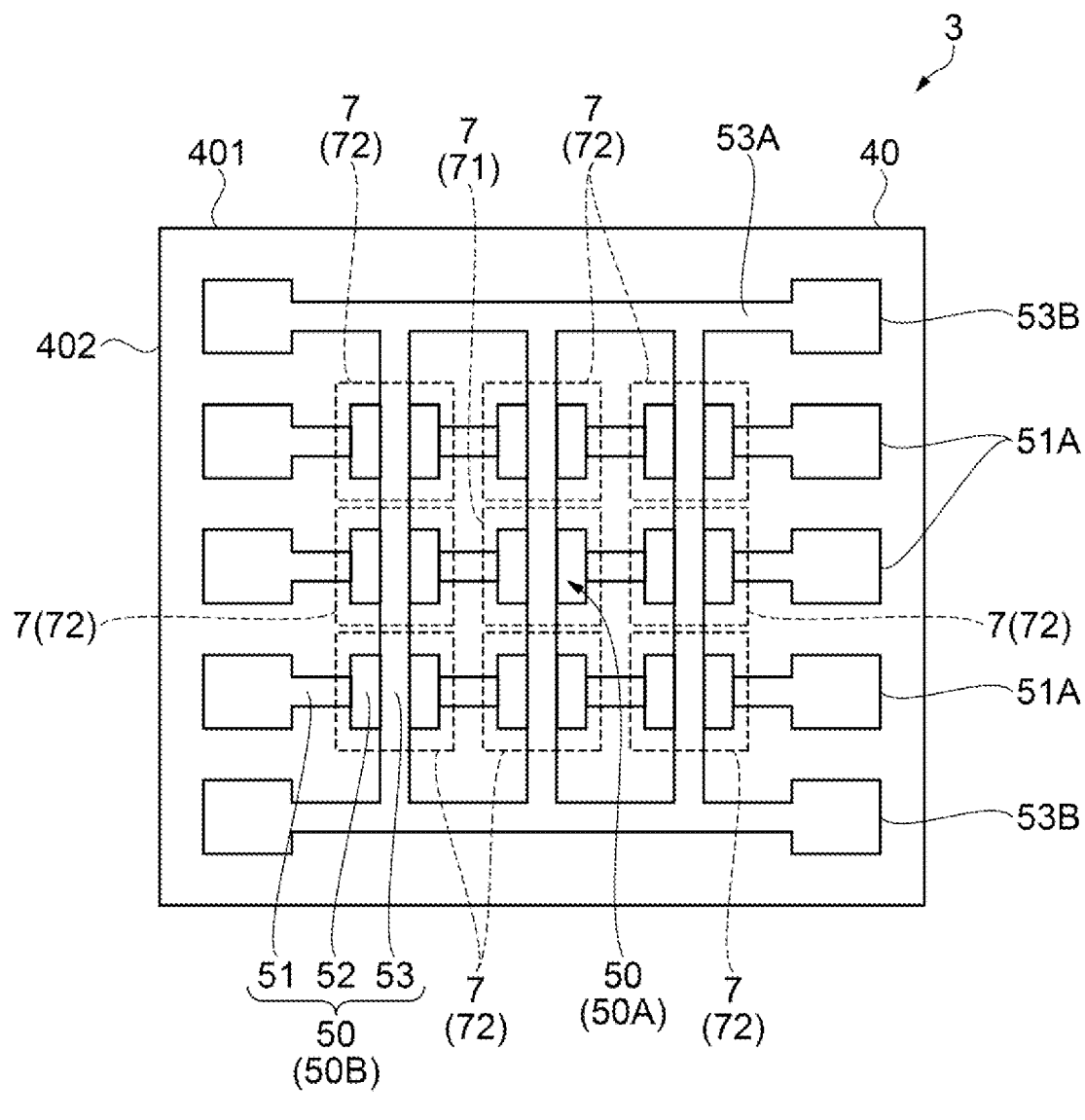
FIG. 3 is a plan view illustrating a state of a sonic wave sensor.

As illustrated in FIG. 3, a total of nine sonic wave elements 7 are disposed at the sonic wave sensor 3 in a two-dimensional array, along the X and Y directions intersecting each other. For example, when the X direction is a row direction and the Y direction is a column direction, the sonic wave elements 7 are arrayed in a matrix of three rows and three columns on the sonic wave sensor 3.

The sonic wave element 7 located at a center of the nine sonic wave elements 7 is a receiving element 71. Eight number of the sonic wave elements 7 of the nine sonic wave elements 7 disposed around the receiving element 71 are transmitting elements 72. In this way, the sonic wave sensor 3 has an array structure in which the plurality of transmitting elements 72 surround the receiving element 71.

Figure 4:
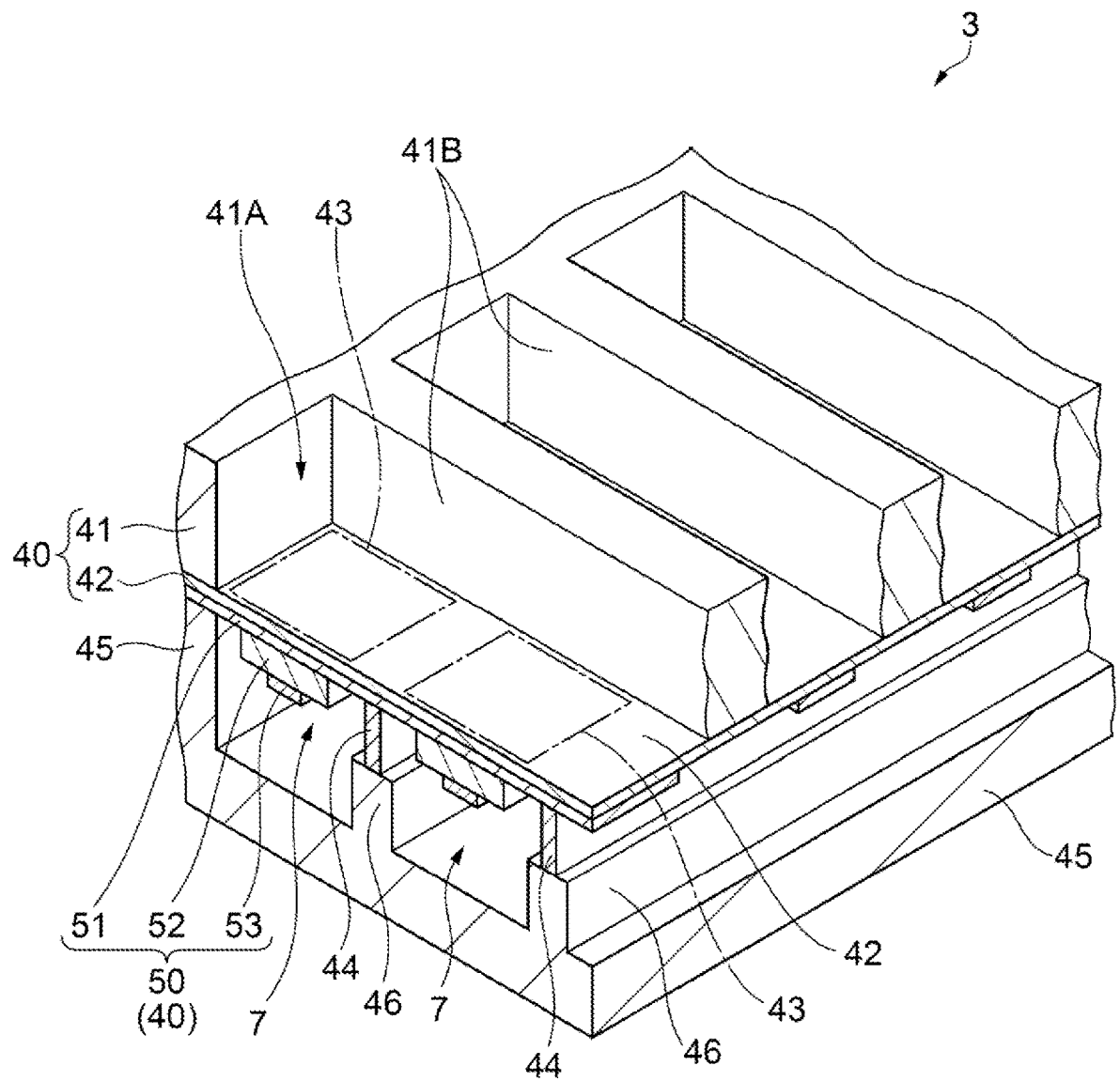
FIG. 4 is a perspective view of the sonic wave sensor.

As illustrated in FIGS. 3 and 4, the sonic wave sensor 3 includes the element substrate 40, support walls 44, and a sealing substrate 45 disposed in order in the +Z direction. The element substrate 40 includes a main body portion 41, a support film 42, and a piezoelectric element 50 disposed in order in the +Z direction.

The main body portion 41 is constituted by a semiconductor substrate made of, for example, Si or the like. The main body portion 41 includes diaphragm portion 41B, and an opening portion 41A that penetrates the main body portion 41. A region surrounded by the diaphragm portions 41B is the opening portion 41A. A plurality of the opening portions 41A that are long in the X direction are provided side by side in the Y direction in the main body portion 41.

The support film 42 is constituted by, for example, a multilayer body made of $SiO_2$ and $ZrO_2$ or the like, and is elastically deformable. A thickness dimension of the support film 42 in the Z direction is sufficiently smaller than a thickness dimension of the main body portion 41 in the Z direction.

The support wall 44 is formed of, for example, resin, and is a member extending in the Y direction. The plurality of support walls 44 are provided side by side in the X direction.

One surface of the support film 42 is joined to the diaphragm portion 41B of the main body portion 41, and another surface of the support film 42 is joined to the support wall 44.

Elastic deformation of a portion of the support film 42 that is joined to either the diaphragm portion 41B or the support wall 44 is suppressed. A portion of the support film 42 that is not joined to both the diaphragm portion 41B and the support wall 44 is elastically deformable, and serves as a vibrating surface 43 that can vibrate in the Z direction.

As illustrated by a dot-dash line in FIG. 4, a portion defined by the diaphragm portion 41B and the support wall 44 of the support film 42 serves as the vibrating surface 43 that can vibrate in the Z direction.

The sonic wave element 7 includes the vibrating surface 43 that can vibrate in the Z direction, and the piezoelectric element 50 coupled to the vibrating surface 43. In plan view viewed in the Z direction, the piezoelectric element 50 is disposed inside the vibrating surface 43. In addition, a region in which the vibrating surface 43 is formed is a region in which the sonic wave element 7 is formed. Thus, the region in which the vibrating surface 43 illustrated by the dot-dash line in FIG. 4 is formed (region defined by the diaphragm portion 41B and the support wall 44) is the region in which the sonic wave element 7 is formed.

When the sonic wave element 7 is formed in the region defined by the diaphragm portion 41B and the support wall 44, an influence of an adjacent sonic wave element 7 (influence of crosstalk) is suppressed by the diaphragm portion 41B and the support wall 44, and the nine sonic wave elements 7 each operate normally.

The piezoelectric element 50 is constituted by a lower electrode 51, a piezoelectric film 52, and an upper electrode 53 that are stacked in order from a side of the support film 42. The lower electrode 51 is coupled to the vibrating surface 43. A vibration of the vibrating surface 43 is transmitted to the piezoelectric film 52 via the lower electrode 51, and a vibration of the piezoelectric film 52 is transmitted to the vibrating surface 43 via the lower electrode 51.

The lower electrode 51 extends in the X direction, the upper electrode 53 extends in the Y direction, and the piezoelectric film 52 is disposed independently in each of nine portions where the lower electrode 51 and the upper electrode overlap with each other. In plan view viewed in the Z direction, a portion where the lower electrode 51, the piezoelectric film 52, and the upper electrode 53 overlap with each other is the piezoelectric element 50. The piezoelectric element 50 is a piezoelectric actuator in a deflection vibration mode.

When a rectangular wave voltage at a predetermined frequency, that is, a drive signal, is applied between the lower electrode 51 and the upper electrode 53, the piezoelectric film 52 contracts or expands to vibrate the vibrating surface 43, and a sonic wave is transmitted from the vibrating surface 43 toward the medium M. Furthermore, the sonic wave transmitted from the vibrating surface 43 is reflected by the medium M.

When the vibrating surface 43 vibrates by the sonic wave reflected by the medium M, a potential difference occurs in the Z direction of the piezoelectric film 52, and a potential difference occurs between the lower electrode 51 and the upper electrode 53. A received sonic wave can be detected, by detecting a potential difference occurring between the lower electrode 51 and the upper electrode 53.

The lower electrode 51 is formed in a straight line along the X direction. Drive terminals 51A coupled to the wiring substrate 4 are provided on both end portions of the lower electrode 51 in the X direction respectively.

The upper electrode 53 is formed in a straight line along the Y direction. Respective end portions on ±Y direction sides of the upper electrode 53 are coupled to a common electrode line 53A. The common electrode line 53A couples a plurality of the upper electrodes 53 disposed in the X direction to each other with wire. A common terminal 53B that is coupled to the wiring substrate 4 is provided at an end portion of the common electrode line 53A in the X direction.

Each of the drive terminal 51A and the common terminal 53B is coupled to a driving circuit 90 via the wiring substrate 4. A drive signal is inputted from the driving circuit 90 to the drive terminal 51A. A predetermined reference potential is applied to the common terminal 53B from the driving circuit 90.

The sealing substrate 45 is constituted by a semiconductor substrate made of Si or the like or an insulating substrate made of glass epoxy or the like, and is disposed facing the element substrate 40. In plan view viewed in the Z direction, the sealing substrate 45 and the element substrate 40 substantially overlap with each other. By providing the sealing substrate 45, the element substrate 40 is reinforced, and mechanical strength of the element substrate 40 is increased.

Note that, a material and a thickness of the sealing substrate 45 may be set based on a center frequency of sonic waves transmitted and received by the sonic wave element 7, since the material and the thickness affect frequency characteristics of the sonic wave element 7.

A beam portion 46 that protrudes from a surface facing the element substrate 40 toward the support wall 44 is provided on the sealing substrate 45. The beam portion 46 is joined to the support wall 44. Accordingly, a gap having a predetermined dimension is provided between the sealing substrate 45 and the vibrating surface 43, and a vibration of the vibrating surface 43 is not inhibited.

The sealing substrate 45 faces the element substrate 40, and seals a reception side piezoelectric element 50A (see FIG. 2) and a transmission side piezoelectric element 50B (see FIG. 2). Specifically, the piezoelectric element 50 (the reception side piezoelectric element 50A, the transmission side piezoelectric element 50B) is disposed in a space sealed by the support film 42, the support wall 44, the beam portion 46, and the sealing substrate 45. Moisture in outside air is unlikely to enter the sealed space, and thus, deterioration of the piezoelectric element 50 due to moisture is suppressed, and reliability of the sonic wave element 7 is enhanced.

Figure 5:
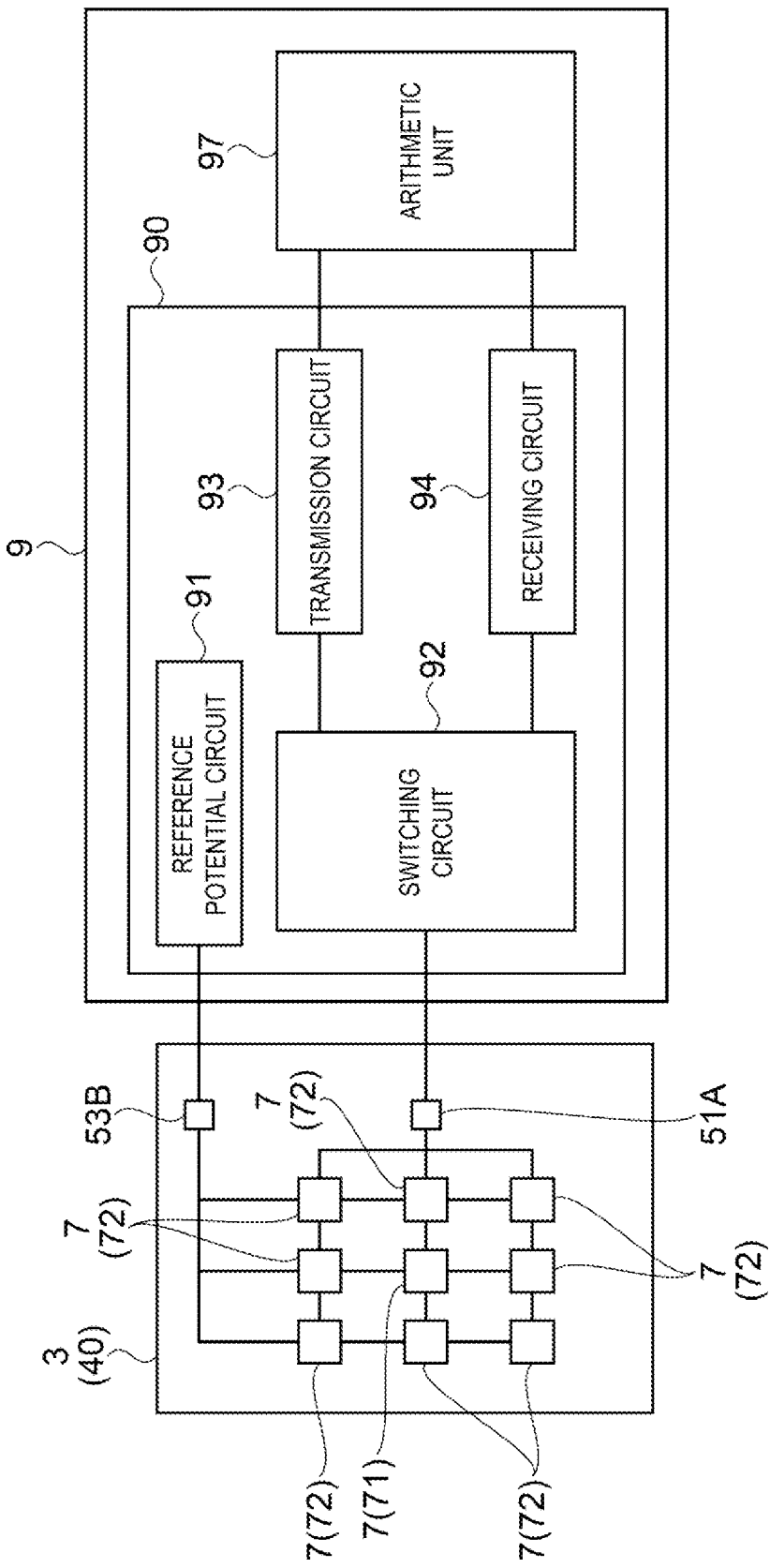
FIG. 5 is a block diagram illustrating a state of a sonic wave element control unit.

As illustrated in FIG. 5, the sonic wave element control unit 9 is constituted by including the driving circuit 90 that drives the sonic wave element 7, and an arithmetic unit 97.

The driving circuit 90 is a driver circuit for controlling driving of the sonic wave element 7, and includes a reference potential circuit 91, a switching circuit 92, a transmission circuit 93, and a receiving circuit 94.

The reference potential circuit 91 is coupled to the common terminal 53B of the upper electrode 53 formed at the element substrate 40, and applies a reference potential to the upper electrode 53.

The switching circuit 92 is coupled to the drive terminal 51A of the lower electrode 51 formed at the element substrate 40, the transmission circuit 93, and the receiving circuit 94. The switching circuit 92 is constituted by a switching circuit, and switches between transmission coupling that couples each of the drive terminals 51A to the transmission circuit 93, and reception coupling that couples each of the drive terminals 51A to the receiving circuit 94.

The transmission circuit 93 is coupled to the switching circuit 92 and the arithmetic unit 97. When the switching circuit 92 is switched to the transmission coupling, the transmission circuit 93 outputs a pulse waveform drive signal to the piezoelectric element 50 based on control of the arithmetic unit 97, and transmits a sonic wave from the sonic wave element 7 toward the medium M.

The receiving circuit 94 is coupled to the switching circuit 92 and the arithmetic unit 97. When the switching circuit 92 is switched to the reception coupling, the receiving circuit 94 receives a potential difference between the lower electrode 51 and the upper electrode 53 due to a sonic wave reflected by the medium M, and transmits the difference to the arithmetic unit 97. The arithmetic unit 97 calculates a distance from the sonic wave sensor unit 2 to the medium M, based on a signal from the receiving circuit 94.

The sonic wave element control unit 9 controls each of the sonic wave elements 7 arrayed in the matrix of three rows and three columns such that the sonic wave element 7 located at the center among the sonic wave elements 7 arrayed in the matrix of three rows and three columns receives a sonic wave reflected by the medium M, and the sonic wave element 7 located around the sonic wave element 7 located at the center transmits a sonic wave toward the medium M.

In the present exemplary embodiment, the sonic wave element 7 located at the center among the sonic wave elements 7 arrayed in the matrix of three rows and three columns serves as the receiving element 71 capable of receiving a sonic wave, and the sonic wave element 7 located around the sonic wave element 7 located at the center serves as the transmitting element 72 capable of transmitting a sonic wave. By employing such an arrangement, when the medium M is detected by separating the vibrating surface 43 from a surface of the medium M, sonic waves transmitted from the plurality of transmitting elements 72 are synthesized, strength of the sonic waves is increased, and the sonic waves with increased strength can be made incident on the surface of the medium M. Thus, strength of sonic waves reflected by the surface of the medium M is also sufficiently increased to be large with respect to noise, and accuracy of reception of sonic waves by one number of the receiving element 71 disposed at the center can be improved.

In the sonic wave element 7 located at the center of the sonic wave elements 7 arrayed in the matrix of three rows and three columns, the vibrating surface 43 of this sonic wave element 7 serves as a reception side vibrating surface 43A, and the piezoelectric element 50 of this sonic wave element 7 serves as the reception side piezoelectric element 50A. In the sonic wave element 7 located around the sonic wave element 7 located at the center, the vibrating surface 43 of this sonic wave element 7 serves as a transmission side vibrating surface 43B, and the piezoelectric element 50 of this sonic wave element 7 serves as the transmission side piezoelectric element 50B.

The receiving element 71 includes the reception side piezoelectric element 50A and the reception side vibrating surface 43A coupled to the reception side piezoelectric element 50A. The transmitting element 72 includes the transmission side piezoelectric element 50B and the transmission side vibrating surface 43B coupled to the transmission side piezoelectric element 50B.

In this manner, the element substrate 40 includes the receiving element 71 including the reception side piezoelectric element 50A and the reception side vibrating surface 43A coupled to the reception side piezoelectric element 50A and capable of receiving a sonic wave reflected by the medium M, and the transmitting element 72 including the transmission side piezoelectric element 50B and the transmission side vibrating surface 43B coupled to the transmission side piezoelectric element 50B and capable of transmitting a sonic wave to the medium M.

Note that, which sonic wave element 7 among the sonic wave elements 7 arrayed in the matrix of three rows and three columns is made to serve as the receiving element 71, and which sonic wave element 7 is made to serve as the transmitting element 72 can be arbitrarily set.

For example, the sonic wave element control unit 9 can make the sonic wave element 7 located at the center of the sonic wave elements 7 arrayed in the matrix of three rows and three columns serve as the transmitting element 72, and make the sonic wave element 7 located around the sonic wave element 7 located at the center serve as the receiving element 71. By employing such an arrangement, when the vibrating surface 43 is brought into close contact with the surface of the medium M to detect the medium M, a sonic wave is transmitted from one number of the transmitting element 72 disposed at the center. Thus, even when the surface of the medium M has a curved surface, accuracy of reception can be improved by receiving, by a plurality of the receiving elements 71, a plurality of sonic waves reflected in a plurality of directions by the curved surface.

Figure 6:
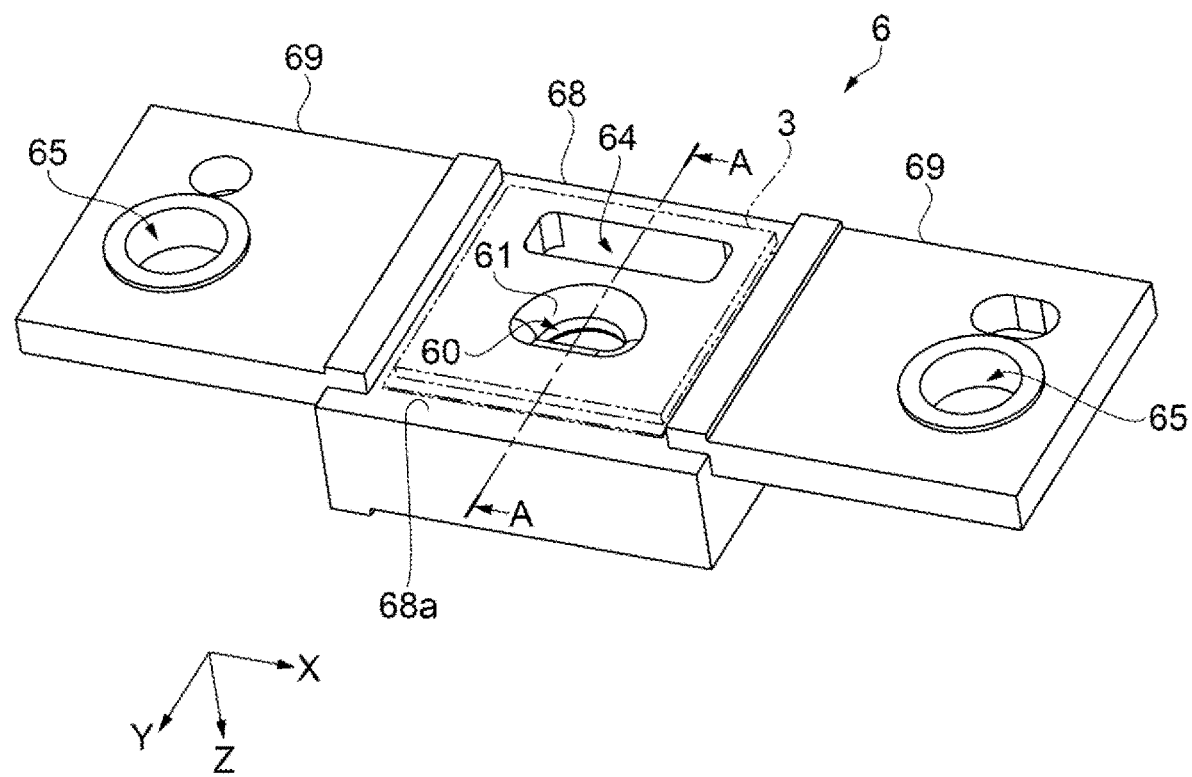
FIG. 6 is a perspective view of a holder.
Figure 7:
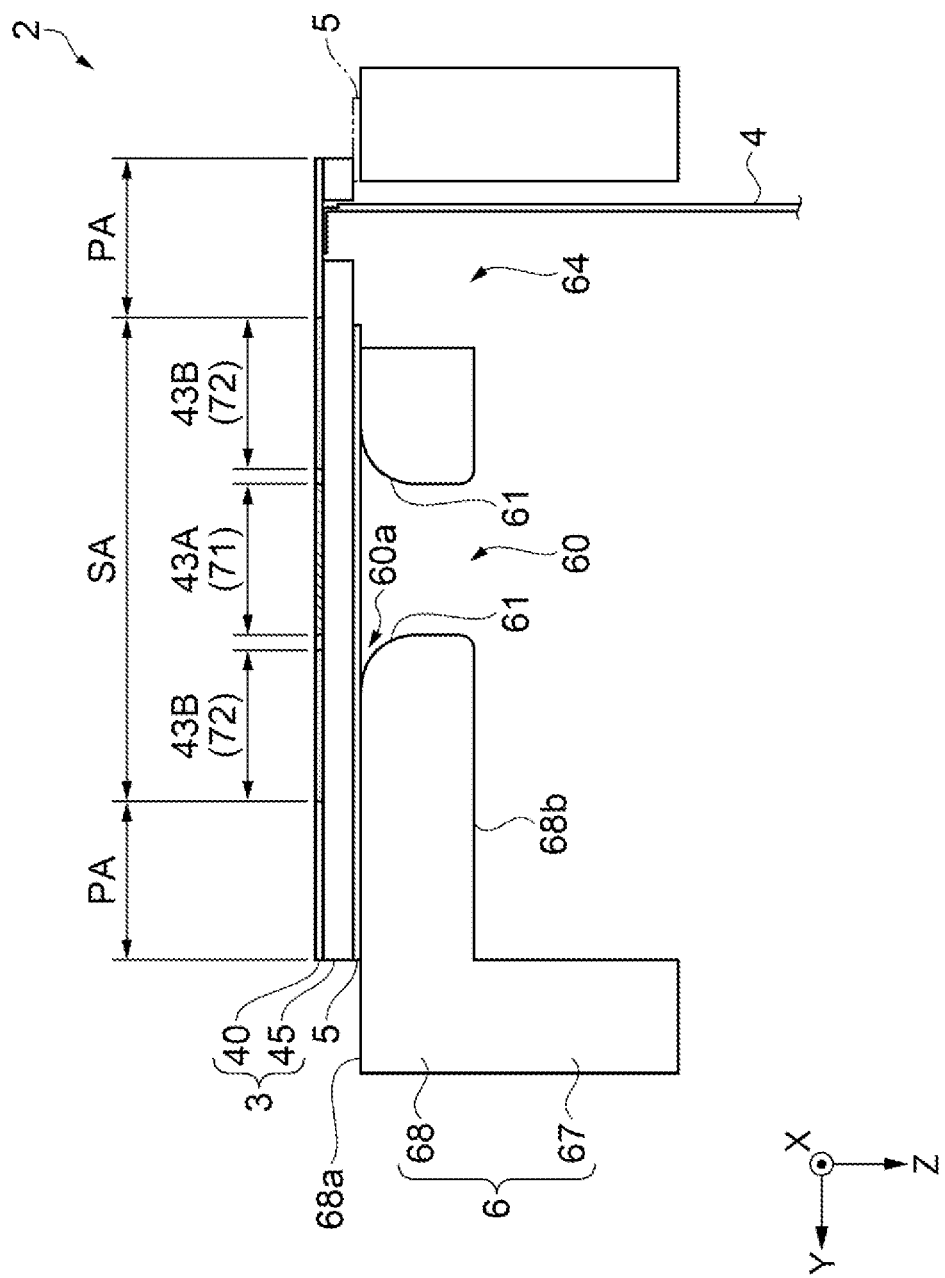
FIG. 7 is a cross-sectional view of the sonic wave sensor unit according to Exemplary Embodiment 1.
Figure 8:
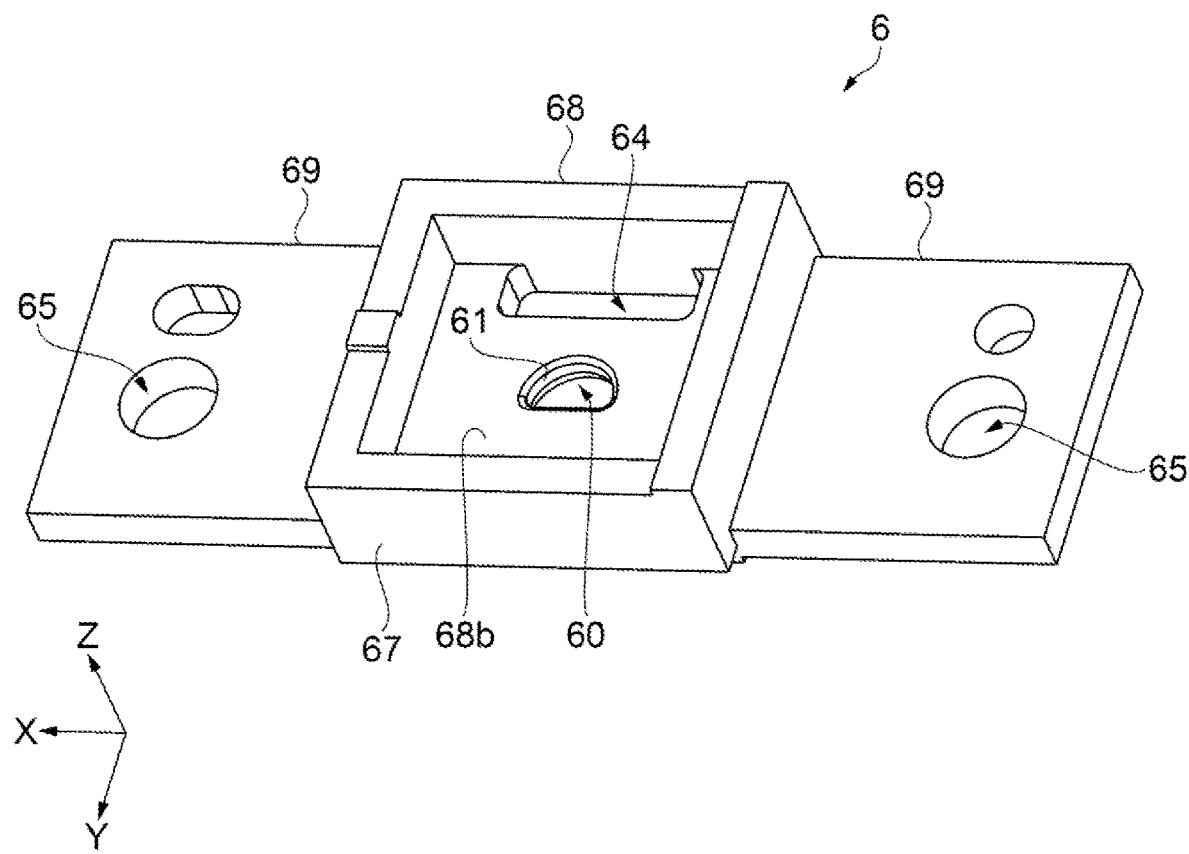
FIG. 8 is another perspective view of the holder.

FIG. 6 is a perspective view of the holder 6 viewed from a side on which the sonic wave sensor 3 is placed. FIG. 7 is a cross-sectional view of the sonic wave sensor unit 2 taken along a line A-A in FIG. 6. FIG. 8 is a perspective view of the holder 6 viewed from an opposite side to the side on which the sonic wave sensor 3 is placed.

Also, in FIG. 6, the sonic wave sensor 3 is illustrated by a two-dot chain line. In FIG. 7, the reception side vibrating surface 43A (receiving element 71) is hatched, and the transmission side vibrating surface 43B (transmitting element 72) is shaded. In addition, FIG. 7 does not illustrate the support wall 44.

As illustrated in FIGS. 6 and 7, the holder 6 is a molded body of resin formed by pouring a thermoplastic resin into a mold. The holder 6 is disposed on an opposite side to the element substrate 40 with respect to the sealing substrate 45 in the −Z direction heading from the sealing substrate 45 toward the element substrate 40, and is fixed to the sealing substrate 45.

The holder 6 includes a support portion 68 that supports the sonic wave sensor 3, and a fixing portion 69 that is fixed to the carriage 34. In the holder 6, the fixing portion 69, the support portion 68, and the fixing portion 69 are disposed in order along the +X direction.

The support portion 68 includes a placement surface 68a on which the sonic wave sensor 3 is placed. The sealing substrate 45 in the sonic wave sensor 3 is bonded to the placement surface 68a of the holder 6 by the viscoelastic adhesive tape 5, and is fixed to the placement surface 68a of the holder 6. In other words, the holder 6 is fixed to the sealing substrate 45 via the viscoelastic adhesive tape 5.

In this way, the sonic wave sensor unit 2 has a configuration in which the sealing substrate 45 and the holder 6 are bonded by the viscoelastic adhesive tape 5.

Note that, the placement surface 68a is an example of a surface that is fixed to the sealing substrate of the holder of the present application.

A screw hole 65 into which a screw (not illustrated) is inserted is provided in the fixing portion 69. With the sonic wave sensor 3 fixed to the holder 6, a screw is inserted into the screw hole 65, and the holder 6 to which the sonic wave sensor 3 is fixed is fixed to the carriage 34 by the screw.

A through hole 60 that penetrates the holder 6 in the −Z direction and a coupling hole 64 through which the wiring substrate 4 is inserted are provided in the support portion 68. That is, the holder 6 is formed with the through hole 60 that penetrates the holder 6 in the −Z direction. An end of the through hole 60 on a side in the −Z direction is an edge 60a of the through hole 60. Additionally, the edge 60a of the through hole 60 can be rephrased as an end on a side in the −Z direction of the wall surface 61 that forms (constitutes) the through hole 60.

Note that, the through hole 60 is an example of a hole in the present application.

The through hole 60 is surrounded by the wall surface 61 along the Z direction. In other words, a portion of the holder 6 surrounded by the wall surface 61 is the through hole 60 that penetrates the holder 6 in the −Z direction. In the present exemplary embodiment, the wall surface 61 constituting the through hole 60 is curved such that the through hole 60 widens as the wall surface 61 extends in the −Z direction that is heading from the sealing substrate 45 toward the element substrate 40.

As illustrated in FIG. 8, the holder 6 includes a non-fixed surface 68b on a side opposite to the surface on which the sealing substrate 45 is fixed (placement surface 68a). The non-fixed surface 68b is disposed parallel to the XY plane (horizontal plane). A protruding portion 67 that protrudes in the +Z direction from the non-fixed surface 68b is formed at the non-fixed surface 68b. In plan view viewed in the Z direction, the plurality of transmitting elements 72 and the receiving element 71 formed at the sonic wave sensor 3 are disposed inside the protruding portion 67 that protrudes in the +Z direction from the non-fixed surface 68b (see FIG. 7). In other words, the protruding portion 67 that protrudes from the non-fixed surface 68b is provided so as to surround the plurality of transmitting elements 72.

In this way, in the −Z direction, the protruding portion 67 that protrudes from the non-fixed surface 68b is provided so as to surround the plurality of transmitting elements 72, at the non-fixed surface 68b on the side opposite to the surface (placement surface 68a) that is fixed to the sealing substrate 45 of the holder 6.

By providing the protruding portion 67 at the non-fixed surface 68b, mechanical strength of the support portion 68 is increased.

Thus, when the holder 6 to which the sonic wave sensor 3 is fixed is fixed to the carriage 34 by a screw, deformation such as deflection is unlikely to occur in the support portion 68, and mechanical damage is unlikely to occur in the sonic wave sensor 3. Furthermore, when the holder 6 to which the sonic wave sensor 3 is fixed is handled as well, deformation such as deflection is unlikely to occur in the support portion 68, and mechanical damage is unlikely to occur in the sonic wave sensor 3. In addition, the bonding between the sonic wave sensor 3 (sealing substrate 45) and the holder 6 is unlikely to be released, thus the sonic wave sensor 3 is fixed to the holder 6 with stability.

Figure 9:
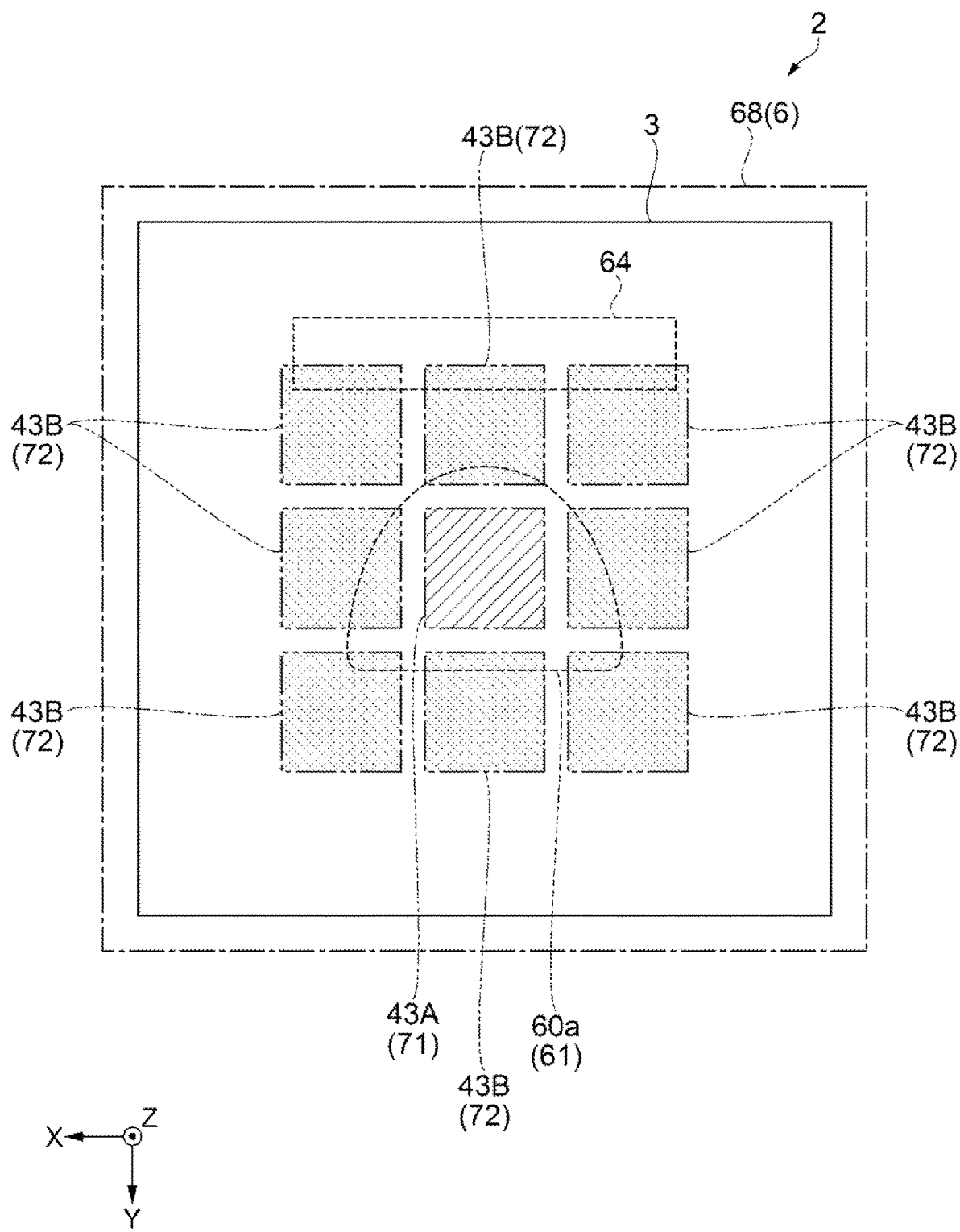
FIG. 9 is a plan view of the sonic wave sensor unit as viewed in a Z direction.

FIG. 9 is a plan view of the sonic wave sensor unit 2 as viewed in the Z direction.

In FIG. 9, a contour of the sonic wave sensor 3 is illustrated by a solid line, a contour of the support portion 68 of the holder 6 is illustrated by a dot-dash line, and an illustration of the wiring substrate 4 is omitted. Furthermore, in FIG. 9, a contour of the vibrating surface 43 (the reception side vibrating surface 43A, the transmission side vibrating surface 43B) formed in the sonic wave sensor 3 is illustrated by a two-dot chain line, the reception side vibrating surface 43A is hatched, and the transmission side vibrating surface 43B is shaded. Furthermore, in FIG. 9, the edge 60a of the through hole 60 and the coupling hole 64 formed in the holder 6 are illustrated by dashed lines. In addition, the edge 60a of the through hole 60 illustrated in the dashed line in FIG. 9 is an end of the wall surface 61 on a side in the −Z direction.

As illustrated in FIGS. 7 and 9, the receiving element (reception side vibrating surface 43A) is surrounded by the plurality of transmitting elements 72 (transmission side vibrating surfaces 43B). In the following description, an area in which the receiving element 71 (reception side vibrating surface 43A) and the plurality of transmitting elements 72 (transmission side vibrating surfaces 43B) are disposed is referred to as a sensor area SA, and an area outside the sensor area SA (area where the sonic wave element 7 is not disposed) is referred to as a peripheral area PA.

In plan view viewed in the Z direction, the reception side vibrating surface 43A is disposed inside the wall surface 61 of the holder 6 constituting the through hole 60. In other words, in plan view viewed in the Z direction, the reception side vibrating surface 43A is disposed inside the edge 60a of the through hole 60.

Furthermore, in plan view viewed in the Z direction, the edge 60a of the through hole 60 overlaps with the plurality of transmission side vibrating surfaces 43B.

In plan view viewed in the Z direction, the through hole 60 has a semi-elliptical shape obtained by dividing an ellipse in half by a short axis thereof. In plan view viewed in the Z direction, the shape of the through hole 60 is arbitrary, as long as a configuration is adopted in which the reception side vibrating surface 43A is disposed inside the wall surface 61 of the holder 6 constituting the through hole 60. For example, the shape of the through hole 60 is not limited to the semi-elliptical shape, may be triangular, rectangular, polygonal, circular, elliptical, or a shape with straight lines and curves.

In the sensor area SA and the peripheral area PA, the sealing substrate 45 of the sonic wave sensor 3 is fixed to the holder 6 by the adhesive tape 5.

In the present exemplary embodiment, the adhesive tape 5 is disposed at a position separated from the wiring substrate 4 to prevent a possibility that a jig for grasping the adhesive tape 5, or the like hits the wiring substrate 4, for example, to apply a mechanical shock, when the adhesive tape 5 is attached to the sonic wave sensor 3. Thus, the adhesive tape 5 is not disposed in the peripheral area PA located on a side in the −Y direction with respect to the coupling hole 64, but is disposed in the peripheral area PA located on a side in the +Y direction with respect to the coupling hole 64 (see FIGS. 7 and 11).

Of course, as illustrated by the two-dot chain line in FIG. 7, the adhesive tape 5 may be disposed on the side in the −Y direction with respect to the coupling hole 64 in addition to the side in the +Y direction with respect to the coupling hole 64. For example, the adhesive tape 5 may be provided with an opening through which the wiring substrate 4 can be inserted, and the adhesive tape 5 may be disposed on the side in the −Y direction with respect to the coupling hole 64, in addition to the side in the +Y direction with respect to the coupling hole 64. Then, the sonic wave sensor 3 and the holder 6 are fixed more strongly by the adhesive tape 5.

Figure 10:
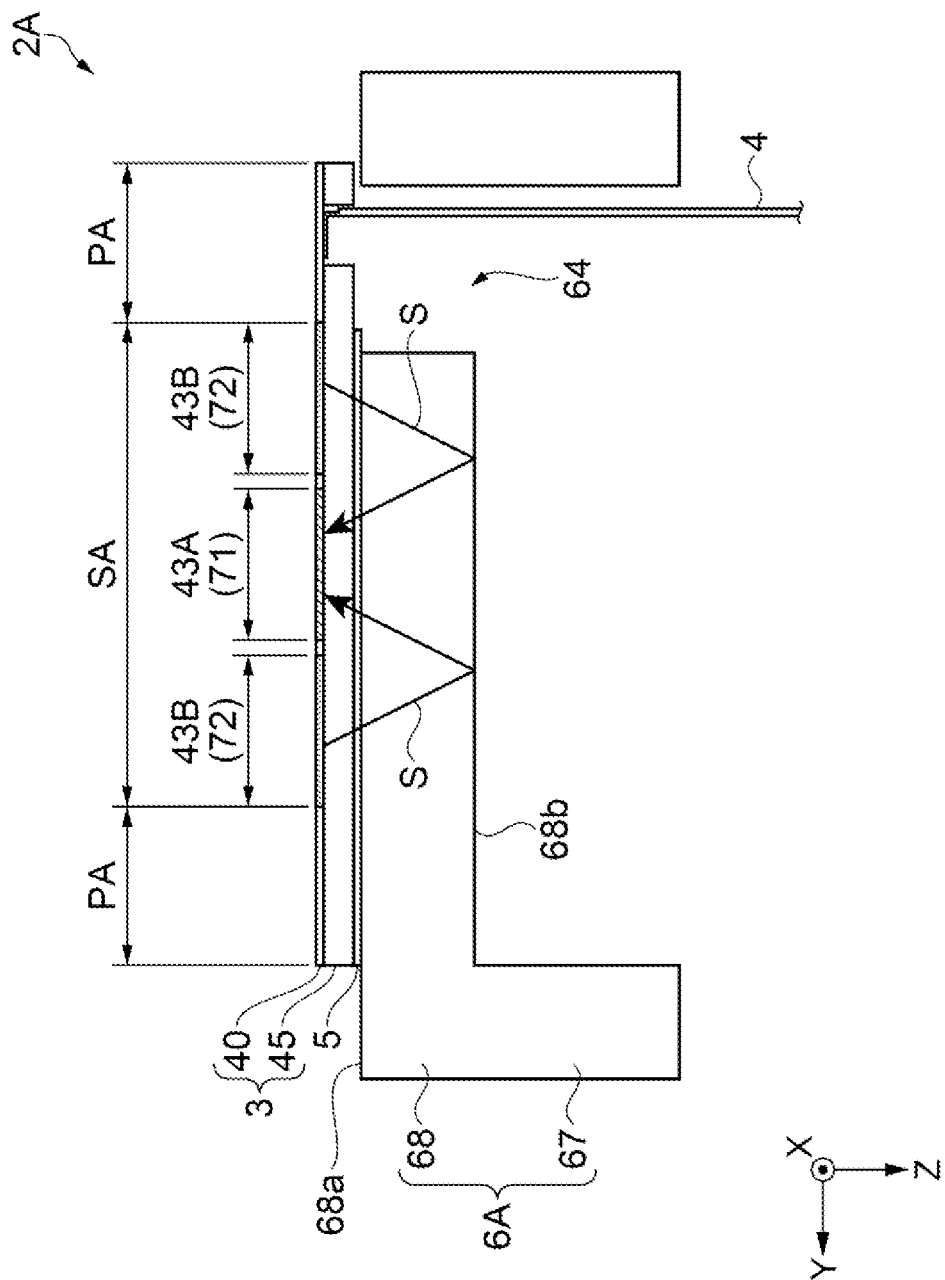
FIG. 10 is a cross-sectional view of a sonic wave sensor unit according to a comparative example.
Figure 11:
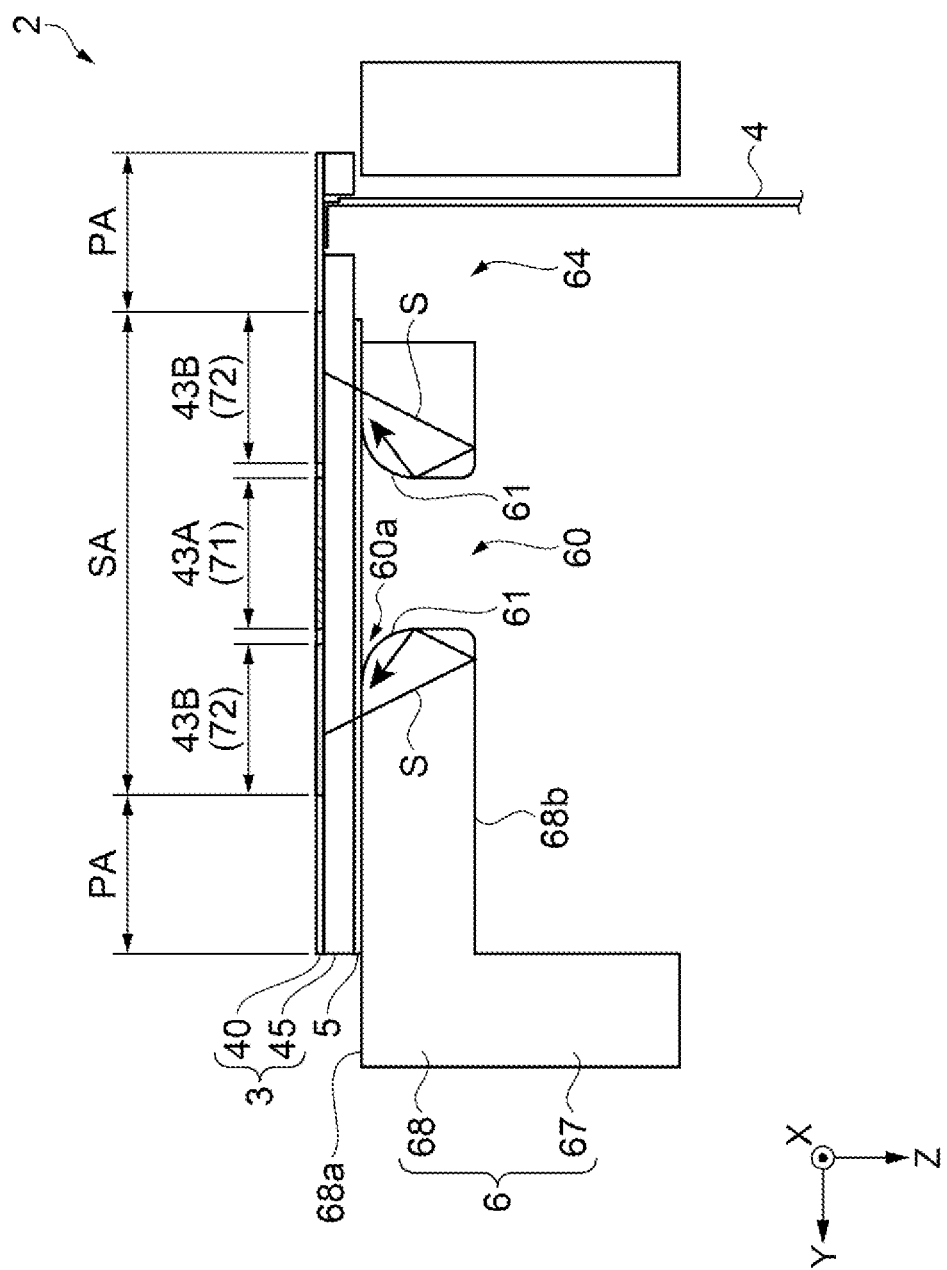
FIG. 11 is a cross-sectional view of the sonic wave sensor unit according to Exemplary Embodiment 1.

FIG. 10 is a diagram corresponding to FIG. 7, and is a cross-sectional view of a sonic wave sensor unit 2A according to a comparative example. FIG. 11 is a diagram corresponding to FIG. 7, and is a cross-sectional view of the sonic wave sensor unit 2 according to the present exemplary embodiment.

In the sonic wave sensor unit 2A according to the comparative example, no through hole 60 is formed in a holder 6A. In the sonic wave sensor unit 2 according to the present embodiment, the through hole 60 is formed in the holder 6. This is a difference between the sonic wave sensor unit 2A according to the comparative example and the sonic wave sensor unit 2 according to the present exemplary embodiment.

When a drive signal is applied to the transmitting element 72, the transmission side piezoelectric element 50B vibrates, and the transmission side vibrating surface 43B coupled to the transmission side piezoelectric element 50B vibrates. Then, air surrounding the transmission side vibrating surface 43B also vibrates, and the vibration makes a sonic wave that is incident on the medium M and is reflected by the medium M. The sonic wave reflected by the medium M is incident on the reception side vibrating surface 43A, the reception side vibrating surface 43A vibrates, the vibration of the reception side vibrating surface 43A is transmitted to the reception side piezoelectric element 50A, a potential difference is generated between the lower electrode 51 and the upper electrode 53 of the reception side piezoelectric element 50A, and a signal is generated due to the vibration of the reception side vibrating surface 43A. The sonic wave element control unit 9 calculates a distance from the sonic wave sensor unit 2 to the medium M, based on the signal due to the vibration of the reception side vibrating surface 43A.

In the following description, the sonic wave reflected by the medium M is referred to as a reflection wave from the medium M.

Furthermore, the vibrations of the transmission side piezoelectric element 50B and the transmission side vibrating surface 43B are transmitted to the element substrate 40, the sealing substrate 45, the holders 6 and 6A, and proceed in the element substrate 40, the sealing substrate 45, the holders 6 and 6A as vibration waves S. In FIGS. 10 and 11, a state of the vibration wave S proceeding through the element substrate 40, the sealing substrate 45, the holders 6 and 6A is schematically illustrated by arrows.

As described above, the sonic wave sensor units 2 and 2A are installed in air. The non-fixed surface 68b and the wall surface 61 disposed on a side in the +Z direction of the holder 6 of the present exemplary embodiment each correspond to a boundary between the thermoplastic resin, which is a component of the holder 6, and air. In other words, the non-fixed surface 68b and the wall surface 61 form a boundary between two materials that differ in density from each other. In this case, one of the two materials is the thermoplastic resin and another is the air. Similarly, the non-fixed surface 68b disposed on a side in the +Z direction of the holder 6A of the comparative example corresponds to a boundary between a thermoplastic resin, which is a component of the holder 6A, and air. In other words, a boundary between two materials that differ in density from each other is formed. In this case, one of the two materials is the thermoplastic resin and another is the air.

The vibration wave S proceeds in a direction away from the transmitting element 72. Furthermore, the vibration wave S proceeding in the direction away from the transmitting element 72 is reflected by the boundary between the two materials that differ in density from each other. The non-fixed surface 68b and the wall surface 61 are each the boundary between the two materials that differ in density from each other, and thus each serve as a reflection surface that reflects the vibration wave S.

Note that, the non-fixed surface 68b of each of the holders 6 and 6A is disposed parallel to the XY plane (horizontal plane).

As indicated by the arrows in FIG. 10, in the sonic wave sensor unit 2A according to the comparative example, the vibration wave S proceeding in the holder 6A is likely to be reflected by the non-fixed surface 68b and incident on the receiving element 71. Specifically, the vibration wave S proceeding in the holder 6A is repeatedly reflected at the boundary between the two materials that differ in density from each other, such as the non-fixed surface 68b, and converges at a portion where the receiving element 71 is disposed, and enters the receiving element 71 as a reverberation vibration.

Although not illustrated, the vibration wave S proceeding in the sealing substrate 45 is likely to be reflected by an interface between the sealing substrate 45 and the adhesive tape 5, and incident on the receiving element 71. Specifically, the vibration wave S proceeding in the sealing substrate 45 is repeatedly reflected at the boundary between the two materials that differ in density from each other, such as the interface between the sealing substrate 45 and the adhesive tape 5, and converges at a portion where the receiving element 71 is disposed, and enters the receiving element 71 as a reverberation vibration. In this case, one of the two material is resin that forms the adhesive tape 5, and another is air.

In the following description, the vibration wave S reflected by the boundary between the two materials that differ in density from each other, such as the non-fixed surface 68b in the holder 6A of the comparative example is referred to as a reflection wave from the holder 6A, and the vibration wave S reflected by the boundary between the two materials that differ in density from each other, such as the non-fixed surface 68b in the holder 6 of the present exemplary embodiment is referred to as a reflection wave from the holder 6. Furthermore, the vibration wave S reflected by the boundary between the two materials that differ in density from each other, such as the interface between the sealing substrate 45 and the adhesive tape 5, is referred to as a reflection wave from the sealing substrate 45.

The sealing substrate 45 is a semiconductor substrate made of Si or the like, or an insulating substrate, and the holder 6A is a molded body made of resin formed by pouring a thermoplastic resin into a mold.

The sealing substrate 45 is formed by performing fine processing on a semiconductor substrate made of Si or the like, and thus has a short dimension in the Z direction as compared to the holder 6A, which is a molded body made of resin, and is formed as a thinner plate. The holder 6A, which is the molded body made of resin, is formed by pouring the thermoplastic resin into the mold, and thus has a long dimension in the Z direction, as compared to the sealing substrate 45, and is difficult to be formed as a thin plate. Thus, a reflection wave from the sealing substrate 45 enters the receiving element 71 earlier, and a reflection wave from the holder 6A enters the receiving element 71 later.

In addition, the holder 6 of the present exemplary embodiment is the molded body made of resin that is identical to the holder 6A of the comparative example, and a reflection wave from the sealing substrate 45 enters the receiving element 71 earlier, and a reflection wave from the holder 6 enters the receiving element 71 later.

When the transmitting element 72 is driven, a sonic wave propagating in air, and the vibration waves S propagating in the element substrate 40, the sealing substrate 45, and the holder 6A occur simultaneously.

The sonic wave propagating in the air is incident on the receiving element 71 as a reflection wave from the medium M. The vibration waves S propagating in the element substrate 40, the sealing substrate 45, and the holder 6A are incident on the receiving element 71 as a reflection wave from the sealing substrate 45 and a reflection wave from the holder 6A.

The reflection wave from the sealing substrate 45 is incident on the receiving element 71 earlier than the reflection wave from the holder 6A, and is incident on the receiving element 71 earlier than the reflection wave from the medium M.

In the sonic wave element control unit 9, the switching circuit 92 adjusts reception coupling timing of the receiving circuit 94 such that the receiving circuit 94 receives a signal due to a reflection wave from the medium M, and does not receive a signal due to a reflection wave from the sealing substrate 45. Thus, even when a reflection wave from the sealing substrate 45 occurs, the receiving circuit 94 does not receive a signal due to the reflection wave from the sealing substrate 45. That is, the reception coupling timing of the receiving circuit 94 is adjusted such that the receiving circuit 94 does not receive a signal due to a reflection wave from the sealing substrate 45.

However, a reflection wave from the holder 6A is incident on the receiving element 71 at the same time as a reflection wave from the medium M. Reasons for this includes that a distance from the surface of the medium M to the vibrating surface 43 has a similar scale to that of a distance from the vibrating surface 43 to the non-fixed surface 68b, that a time for a reflection wave from the medium M to reach the receiving element 71 is similar to a time for a reflection wave from the holder 6A to reach the receiving element 71, and the like. Thus, it is difficult to adjust the reception coupling timing of the receiving circuit 94 such that the receiving circuit 94 does not receive a signal due to a reflection wave from the holder 6A, and the receiving circuit 94 receives a signal due to a reflection wave from the holder 6A, in addition to a signal due to a reflection wave from the medium M. Accordingly, a signal due to a reflection wave from the holder 6A becomes noise, and it is difficult for the arithmetic unit 97 to accurately calculate the distance from the sonic wave sensor unit 2 to the medium M, based on a signal from the receiving circuit 94. As a result, it is difficult for the control unit 10 to accurately calculate an interval between the nozzle formation surface 32 of the recording head 31 and the medium M, based on a calculation result of the sonic wave element control unit 9.

As indicated by the arrow in FIG. 11, in the sonic wave sensor unit 2 according to the present exemplary embodiment, the vibration wave S in the holder 6 is reflected by the wall surface 61 that intersects the non-fixed surface 68b in addition to the non-fixed surface 68b, and thus is unlikely to be incident on the receiving element 71. Specifically, since the receiving element 71 is separated from the holder 6 by the through hole 60, the vibration wave S proceeding in the holder 6 while being repeatedly reflected by the boundary of the two materials that differ in density from each other, that is, a reflection wave from the holder 6, is unlikely to be incident on the receiving element 71.

As a result, the receiving circuit 94 receives a signal due to a reflection wave from the medium M, and does not receive a signal due to a reflection wave from the holder 6, and the arithmetic unit 97 can accurately calculate the distance from the sonic wave sensor unit 2 to the medium M, based on a signal from the receiving circuit 94. Accordingly, the control unit 10 can accurately calculate the interval between the nozzle formation surface 32 of the recording head 31 and the medium M, based on a calculation result of the sonic wave element control unit 9.

The present exemplary embodiment has a configuration in which the holder 6 is fixed to the sealing substrate 45 via the viscoelastic adhesive tape 5. When the viscoelastic adhesive tape 5 is disposed between the sealing substrate 45 and the holder 6, the adhesive tape 5 serves as a damper that absorbs an unwanted vibration, and it is possible to weaken vibrations transmitted to the element substrate 40, the sealing substrate 45, and the holder 6 (vibration waves S).

The present exemplary embodiment, in plan view viewed in the Z direction, has a configuration in which the edge 60a of the through hole 60 overlaps with the plurality of transmission side vibrating surfaces 43B. As a result, the sonic wave sensor 3 and the holder 6 are fixed by the adhesive tape 5, in the sensor area SA and the peripheral area PA disposed outside the edge 60a of the through hole 60.

With such a configuration, compared to a configuration in which the sonic wave sensor 3 and the holder 6 are fixed by the adhesive tape 5 only in the peripheral area PA, the sonic wave sensor 3 and the holder 6 are strongly fixed, and the fixation between the sonic wave sensor 3 and the holder 6 is unlikely to be released, even when a vibration or a mechanical shock is applied.

There is a possibility that a vibration in the sensor area SA due to a vibration of the transmitting element 72 is propagated to the peripheral area PA and, for example, is amplified to a strong vibration in the peripheral area PA by a phenomenon such as resonance.

With a configuration in which the sonic wave sensor 3 and the holder 6 are fixed by the adhesive tape 5 in the sensor area SA and the peripheral area PA disposed outside the edge 60*a* of the through hole 60, even when a vibration is amplified to be strong in the peripheral area PA, since the sonic wave sensor 3 and the holder 6 are fixed by the adhesive tape 5 in the peripheral area PA, the strong vibration amplified in the peripheral area PA is unlikely to be transmitted to the receiving element 71 in the sensor area SA.

As a result, negative effects of the strong vibration amplified in the peripheral area PA are suppressed, and the control unit 10 can improve detection accuracy of the interval between the nozzle formation surface 32 of the recording head 31 and the medium M, based on a calculation result of the sonic wave element control unit 9.

In the present exemplary embodiment, there is a case where a strong vibration amplified in the peripheral area PA located on the side in the −Y direction with respect to the coupling hole 64 occurs, and thus the sonic wave sensor 3 and the holder 6 are fixed by the adhesive tape 5, in the peripheral area PA located on the side in the −Y direction with respect to the coupling hole 64.

Note that, an area where a strong vibration occurs due to a phenomenon such as resonance is not limited to the peripheral area PA located on the side in the −Y direction with respect to the coupling hole 64. For example, when a strong vibration amplified in the peripheral area PA located on the side in the +Y direction side with respect to the coupling hole 64 occurs, in addition to the peripheral area PA located on the side in the −Y direction with respect to the coupling hole 64, the sonic wave sensor 3 and the holder 6 may be fixed by the adhesive tape 5, in addition to the peripheral area PA located on the side in the −Y direction with respect to the coupling hole 64, in the peripheral area PA located on the side in the +Y direction with respect to the coupling hole 64.

The present exemplary embodiment has a configuration in which the wall surface 61 constituting the through hole 60 is curved such that the through hole 60 widens as the wall surface 61 extends in the −Z direction.

With such a configuration, even when vibrations of the transmission side piezoelectric element 50B and the transmission side vibrating surface 43B become sonic waves, and propagate to a space within the through hole 60 surrounded by the wall surface 61, the sonic waves are unlikely to be reflected by the wall surface 61 in a direction in which the receiving element 71 is disposed.

Furthermore, with the configuration in which the wall surface 61 is curved, compared to a configuration in which the wall surface 61 is not curved, for example, cracks and the like are unlikely to occur in the wall surface 61 when deformation such as deflection occurs in the holder 6, and resistance of the holder 6 can be increased.

2. Exemplary Embodiment 2

Figure 12:
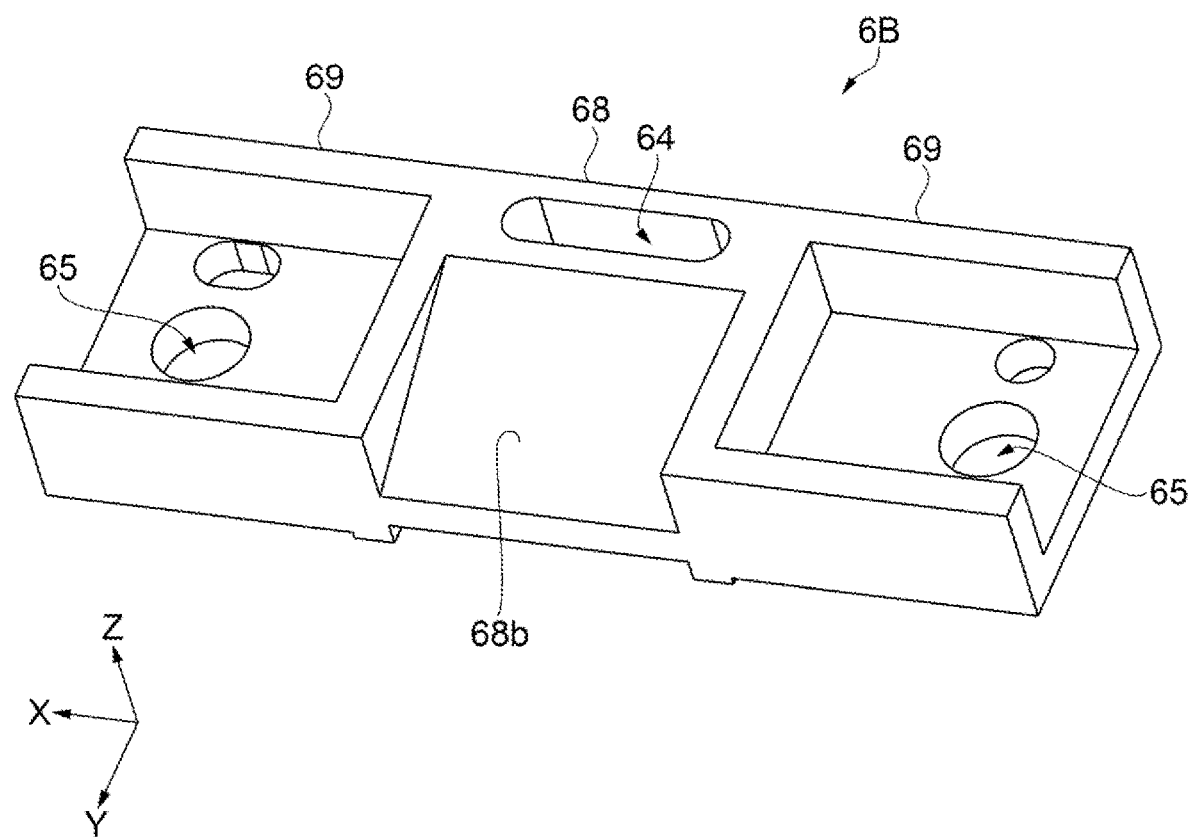
FIG. 12 is a perspective view of a holder included in a sonic wave sensor unit according to Exemplary Embodiment 2.
Figure 13:
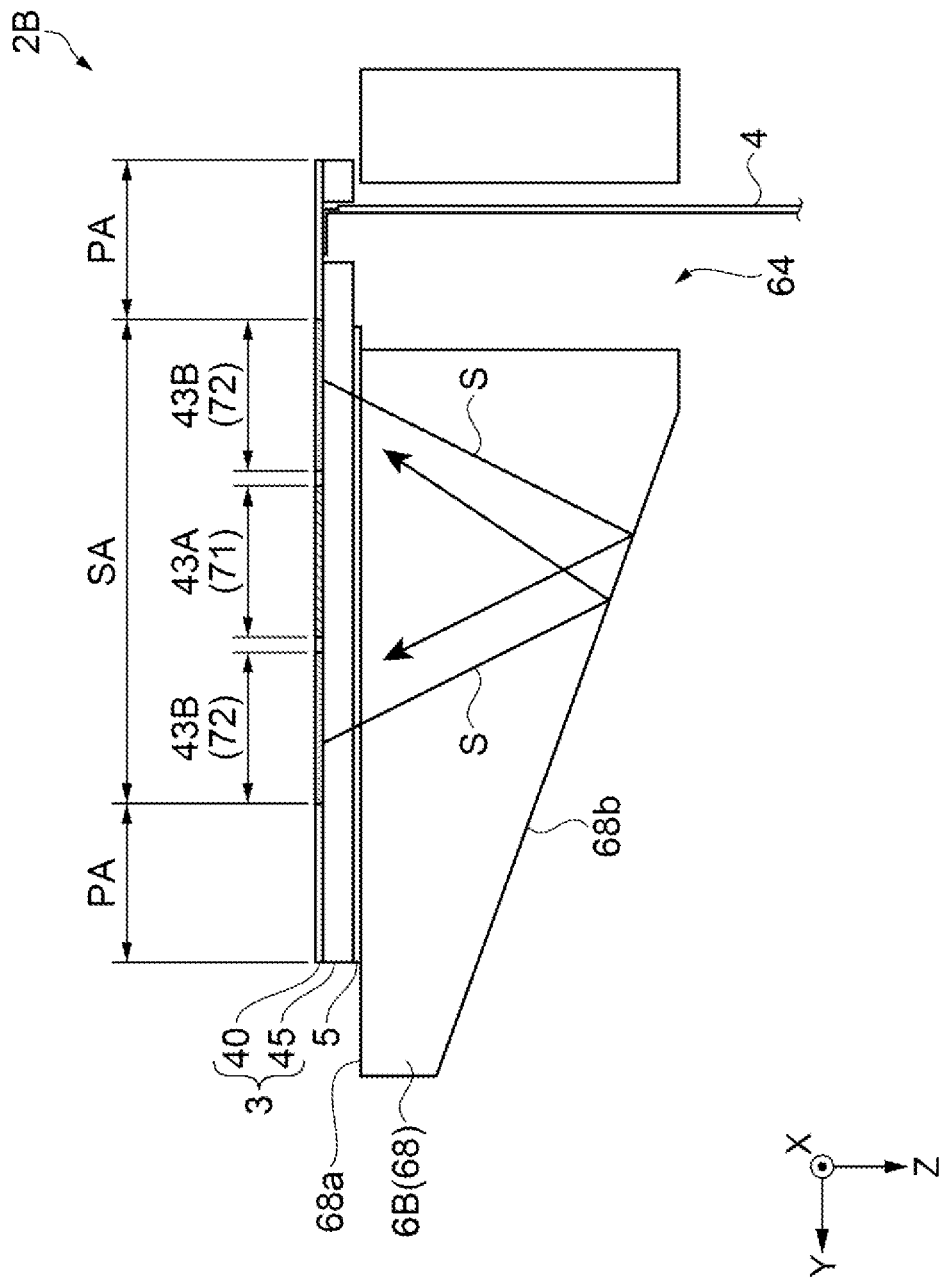
FIG. 13 is a cross-sectional view of the sonic wave sensor unit according to Exemplary Embodiment 2.

FIG. 12 is a diagram corresponding to FIG. 8, and is a perspective view of a holder 6B included in a sonic wave sensor unit 2B according to Exemplary Embodiment 2. FIG. 13 is a diagram corresponding to FIG. 10 and is a cross-sectional view of the sonic wave sensor unit 2B according to the present exemplary embodiment.

The sonic wave sensor unit 2B according to the present exemplary embodiment and the sonic wave sensor unit 2A according to the comparative example are different in a shape of the non-fixed surface 68*b*. In other words, the non-fixed surface 68*b* of the holder 6B of the present exemplary embodiment is inclined with respect to the XY plane (horizontal plane). The non-fixed surface 68*b* of the holder 6A of the comparative example is parallel to the XY plane. This is a main difference between the sonic wave sensor unit 2B according to the present exemplary embodiment and the sonic wave sensor unit 2A according to the comparative example.

Furthermore, the sonic wave sensor unit 2B according to the present exemplary embodiment and the sonic wave sensor unit 2 according to the Exemplary Embodiment 1 have an identical configuration except for the holders 6 and 6B.

As illustrated in FIG. 12, the non-fixed surface 68*b* of the present exemplary embodiment is inclined with respect to the XY plane. Thus, as illustrated in FIG. 13, the vibration wave S is unlikely to be reflected in a direction in which the receiving element 71 is disposed by the non-fixed surface 68*b* that is inclined with respect to the XY plane.

As a result, compared to the sonic wave sensor unit 2A according to the comparative example, in the sonic wave sensor unit 2B according to the present exemplary embodiment, the reception circuit 94 is unlikely to receive a signal due to a reflection wave of the holder 6B, and the arithmetic unit 97 is more likely to accurately calculate a distance from the sonic wave sensor unit 2 to the medium M based on a signal from the receiving circuit 94. As a result, in the present exemplary embodiment, the control unit 10 is more likely to accurately calculate an interval between the nozzle formation surface 32 of the recording head 31 and the medium M, based on a calculation result of the sonic wave element control unit 9.

Figure 14:
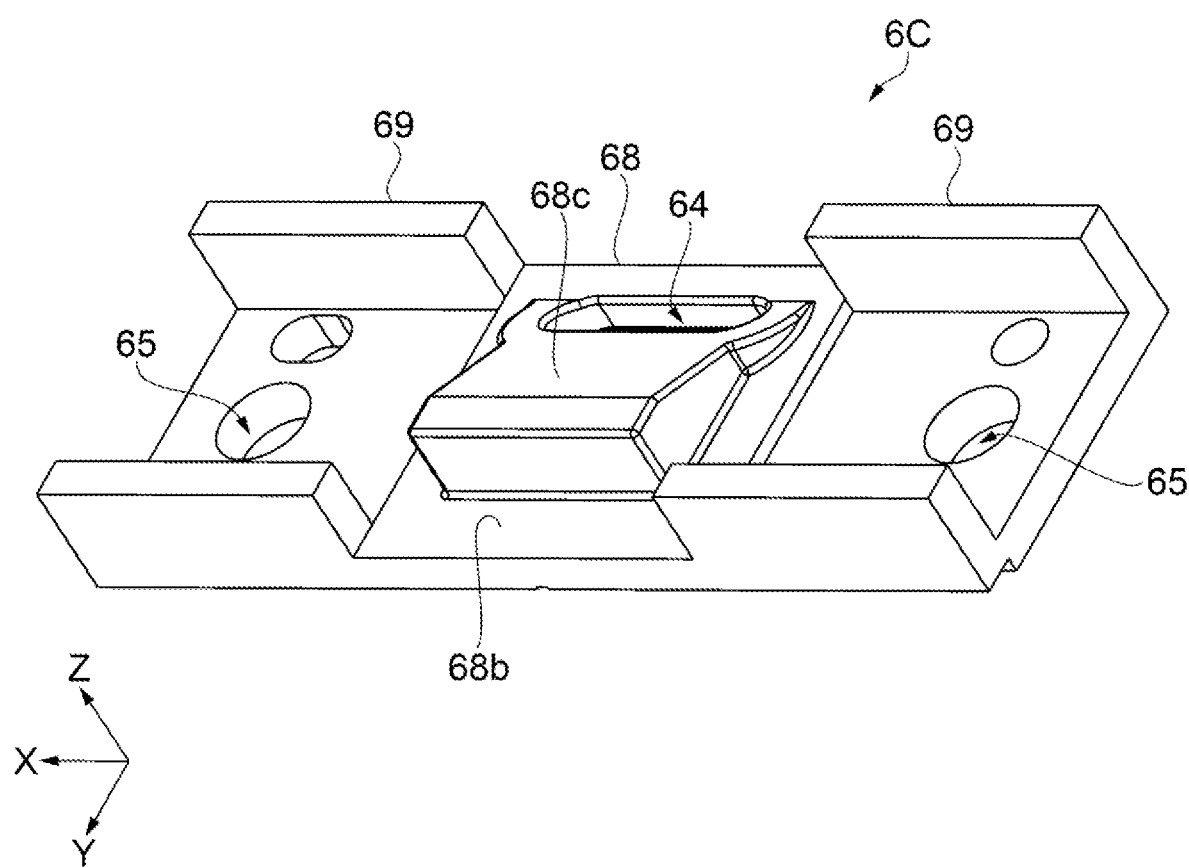
FIG. 14 is a perspective view of another holder included in the sonic wave sensor unit according to Exemplary Embodiment 2.

Furthermore, as illustrated in FIG. 14, a configuration may be adopted in which the non-fixed surface 68*b* of a holder 6C has a protruding portion 68*c* that protrudes in the +Z direction. When the non-fixed surface 68*b* is provided with the protruding portion 68*c* that protrudes in the +Z direction, as in the case of the above-described configuration in which the non-fixed surface 68*b* is inclined with respect to the XY plane (holder 6B described above), compared to the configuration in which the non-fixed surface 68*b* is parallel to the XY plane (holder 6A of the comparative example), the vibration wave S is unlikely to be reflected in the direction in which the receiving element 71 is disposed, by the non-fixed surface 68*b* having the protruding portion 68*c* protruding in the +Z direction, and the vibration wave S is unlikely to be incident on the receiving element 71. As a result, an effect similar to that of the holder 6B described above can be obtained.

What is claimed is:

1. A sonic wave sensor unit, comprising:
   a sonic wave sensor including
      an element substrate having a transmitting element having a transmission side piezoelectric element and a transmission side vibrating surface coupled to the transmission side piezoelectric element and configured to transmit a sonic wave to a target, and a receiving element having a reception side piezoelectric element and a reception side vibrating surface coupled to the reception side piezoelectric element and configured to receive a sonic wave reflected by the target and a sealing substrate facing the element substrate, and configured to seal the transmission side piezoelectric element and the reception side piezoelectric element; and a holder disposed on a side opposite to the element substrate with respect to the sealing substrate, in a first direction from the sealing substrate toward the element substrate, the holder being fixed to the sealing substrate, wherein a hole is formed in the holder, the hole extending through the holder in the first direction, and in plan view viewed in the first direction, the reception side vibrating surface is disposed inside a wall surface of the holder constituting the hole.

2. The sonic wave sensor unit according to claim 1, wherein
the wall surface is curved such that the hole widens toward the first direction.

3. The sonic wave sensor unit according to claim 1, wherein
the holder is fixed to the sealing substrate via a viscoelastic adhesive tape.

4. The sonic wave sensor unit according to claim 1, wherein
the sonic wave sensor has an array structure in which a plurality of the transmitting elements surround the receiving element, and
in plan view viewed in the first direction, an edge of the hole overlaps with a plurality of the transmission side vibrating surfaces.

5. The sonic wave sensor unit according to claim 4, wherein
in the first direction, a protruding portion is provided at a non-fixed surface of the holder on an opposite side to a surface that is fixed to the sealing substrate, the protruding portion protruding from the non-fixed surface and surrounding the plurality of transmitting elements.

6. A recording device, comprising:
the sonic wave sensor unit according to claim 1;
a recording head configured to perform recording on the target; and
a carriage to which the sonic wave sensor unit and the recording head are attached.

* * * * *